2,989,646
Patented June 20, 1961

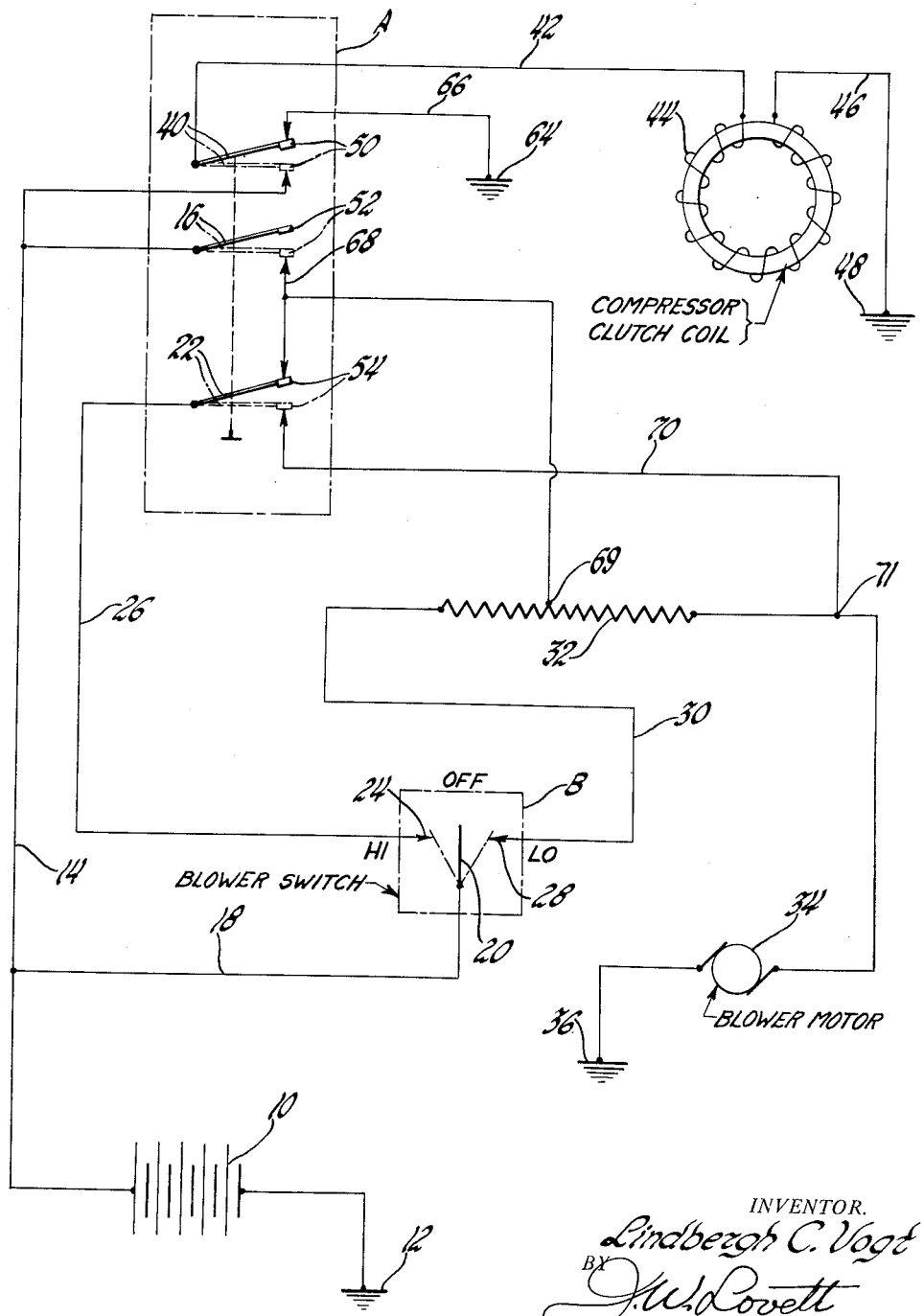

2,989,646
ELECTRICAL CONTROL CIRCUITS APPLICABLE TO VEHICLE HEATING AND AIR CONDITIONING
Lindbergh C. Vogt, Flint, Mich., assignor to General Motors Corporation, Detroit, Mich., a corporation of Delaware
Filed Sept. 26, 1957, Ser. No. 686,358
5 Claims. (Cl. 307—38)

This invention relates to control circuits and more particularly to circuits for controlling systems each involving a multispeed electric motor and a second electrically operated device such as a compressor clutch coil.

In modern automotive vehicles it has become conventional to employ combination heating and air conditioning systems and in each of some of these systems a single blower is used to introduce the air into the passenger compartment, this blower serving in a single duct for air delivery when the air conditioning components are in operation or when the heating system is being employed. A system of this type is disclosed in the United States patent application Serial No. 535,611 filed September 21, 1955, in the names of Messrs. Boylan, Doane and Mc-Manama and issued July 7, 1959 as Patent No. 2,893,700.

The controls of such systems have been somewhat complicated as the blower motor speed must be so regulated as to suit the conditions obtaining at the time of operation. Generally speaking, the proper operation of the heating system requires a low speed and a medium speed for the blower motor. With air conditioning, however, more air is generally required and the blower motor should operate either at a medium speed or at high speed depending upon the variation in the load placed on the refrigeration system. A problem has arisen as to integrating the controls of the blower motor so that both systems may best be served and so that adeptness need not be required of the operator.

An object of the present invention is to provide a control circuit for a multispeed electric motor whereby a low speed and an intermediate speed may be had under given conditions and an intermediate speed or a high speed may be had under other conditions. Another object of the invention is to provide a control circuit for a multispeed motor for driving a blower in one range of speed for purposes such as heating, this circuit being integrated with a control for operating that motor at a higher range of speed when a second electrically operated device such as a compressor clutch in an air conditioning system is used.

To these ends, a feature of the invention resides in a control circuit employing a single pole, double throw switch and a multipole, double throw switch each of which is suitably connected to a source of electrical power and adapted to control a multispeed motor to secure a dual two-stage speed selection for the latter.

These and other important features of the invention will now be described in the specification and then pointed out more particularly in the appended claims.

In the drawing:

The single figure is a diagrammatic representation of a control circuit employed in a combination heating and air conditioning system of the type disclosed in the Patent No. 2,893,700, heretofore referred to, and in which a single blower is operated by a motor having a dual two-stage speed selection.

In the drawing, a battery or source 10 of electrical power is shown as connected at 12 to ground. It is also connected by a line 14 to a movable contact arm 16 of a multipole, double throw switch diagrammatically represented in the rectangle A and referred to herein as "second switch means." The battery 10 is also connected by means of a line 18 to the movable contact arm 20 of a single pole, double throw switch B herein referred to as a "first switch means" and also depicted by a dot-and-dash line rectangle. A second contact arm 22 of the switch A is connected to a fixed contact 24 of the switch B by means of a line 26. A second fixed contact 28 of the switch B is connected by a line 30 to one end of a tapped resistance 32 in the circuit of a blower motor indicated at 34. This motor is grounded as at 36. A third contact arm 40 of the switch A is connected by means of a line 42 to one end of a coil 44 which is part of a device for actuating a compressor clutch. The other end of this coil is connected by a line 46 to ground at 48. The engagement of a clutch to drive a compressor for air conditioning may be carried out electrically in various ways. One way is taught in the United States patent application Serial No. 418,931 filed March 26, 1954, in the name of James W. Jacobs and issued December 30, 1958 as Patent No. 2,866,528.

The switch A may be of any conventional construction and has been shown only diagrammatically as provided with fixed contacts and the contacts 50, 52 and 54 on the movable contact arms 40, 16 and 22, respectively, which are adapted to be simultaneously moved by any suitable manually controlled operating means to either the position shown in full lines or the position shown in dot-and-dash lines. When in the position shown in full lines, it will be seen that contact 50 connects line 42 to a ground 64 by line 66 and contact 54 connects line 26 by a line 68 to an intermediate tap 69 of resistance 32. When moved to the position shown in dot-and-dash lines, the contact 50 will then connect line 14 to line 42, contact 52 will connect line 14 to line 68, and contact 54 will connect line 26 by a line 70 to the blower motor circuit at 71.

With the switch A operated to position the contacts 50, 52 and 54 as shown in full lines in the drawings, the "HI-OFF-LO" switch B may be operated to control the blower motor 34 in a conventional manner for heating purposes. In the "LO" position the motor 34 will operate at its low speed because of the current passing through the line 30 and resistance 32. When the switch B is set to the "HI" position the current would go by line 26 and line 68 to the tap of the resistance 32 and thereby operate the motor 34 at intermediate speed. For heating, then, it is seen that either a low or intermediate blower speed is available.

Assuming that air conditioning is desired, the switch A will be operated to place the contacts 50, 52 and 54 into their positions as designated by dot-and-dash lines in the drawing. The switch B may then be manually set to either the "LO" or the "OFF" position and an intermediate speed of the motor 34 will be secured because the current will go through line 14 and by way of contact 52 and line 68 to the tap of the resistance 32. If the switch B is set to the "HI" position, current will then pass by way of line 26, contact 54 and the line 70 around the resistance 32 giving the high speed to the blower motor 34. For air conditioning, then, it is seen that either an intermediate or high blower speed is available.

Whether a high speed or an intermediate speed is imparted to the blower 34 for air conditioning purposes, the contact 50 will be so positioned as to cause current to pass through line 14, contact 50 and line 42 simultaneously to energize the coil 44 and bring about operation of the compressor and the refrigeration system.

With this arrangement the blower serving a given duct air delivery system for either heating or cooling requirements is automatically activated at a speed to suit the given conditions with a further speed selection being presented by the switch B for air conditioning. The blower is automatically activated at intermediate or high speed whenever the cooling compressor clutch coil 44 is energized. If the manually operated blower switch B is either in the "OFF" position or the "LO" position, the blower will be operated at an intermediate speed which is the minimum speed required for air conditioning. Of course, if the manual switch B happens to be in "HI" speed position, the blower will then operate at high speed upon energization of the cooling compressor clutch.

I claim:

1. In a vehicle heating and air conditioning system, a voltage source, a blower motor energizing circuit including a blower motor and impedance means, an air conditioner circuit, first switch means and second switch means, said first switch means being adapted selectively during heating to connect a major portion of said impedance means between the voltage source and the motor energizing circuit for low-speed blower operation and through said second switch means and a lesser portion of said impedance means between the voltage source and the motor energizing circuit for intermediate-speed blower operation, and said second switch means being adapted during air conditioning selectively to connect said air conditioner circuit in parallel with said lesser portion of said impedance for intermediate speed blower operation and in parallel with said motor energizing circuit and said first switch means as connected around said impedance means and directly across said voltage source for high speed blower operation.

2. In combination, a motor, a voltage source, an auxiliary circuit, low, intermediate and high speed circuits connected across said voltage source for energizing the motor, an impedance, first switch means and second switch means, said first switch means being selectively operative to complete the said low-speed circuit through the said impedance and to complete the said intermediate speed circuit through said second switch means and a portion of said impedance, and said second switching means being adapted to connect said auxiliary circuit across said voltage source and being selectively operative in said completion of said intermediate speed circuit and shunting said impedance through said first switch means so as to complete the said high speed circuit.

3. In combination, a motor, a voltage source, first switch means and second switch means, low intermediate and high speed motor energizing circuits, an impedance, said first switch means being selectively operative to complete the said low speed circuit across said voltage source through the entire impedance for low-speed operation of said motor and to complete the said intermediate speed circuit through said second switch means and a part of the said impedance for intermediate speed operation of said motor, and said second switching means being operative in combination with said first switch means for shunting the impedance so as to complete the high-speed energizing circuit of said motor.

4. In combination, a motor, a voltage source, a pair of resistive elements, low, intermediate and high speed energizing circuits for the said motor, first switch means selectively operative to complete the low speed motor energizing circuit across said voltage source and through both resistive elements for low speed operation of said motor and to complete the intermediate speed energizing circuit across said voltage source and through only one of the resistive elements for operation of said motor, and second switching means cooperative with said first switch means for shunting the resistive elements so as to complete the high-speed energizing circuit for operation of said motor.

5. In a vehicle heating and air conditioning system, a voltage source, a blower motor energizing circuit including a blower motor and resistance means, an air conditioner circuit, first switch means comprising a single pole, double throw switch, second switch means having two positions, said first switch means being adapted selectively during heating to connect all of said resistance means between the said voltage source and the motor energizing circuit to effect low-speed operation of said motor and through said second switch means in one position and a part of said resistance means and across said voltage source and through said motor energizing circuit for intermediate speed operation of said motor, and said second switch means being selectively adapted when in its second position during air conditioning to connect said air conditioner circuit in parallel with a part of said resistance means for intermediate speed operation of said motor and in parallel with said motor energizing circuit as connected through said first switch means and around said resistance means and across said voltage source for high speed operation of said motor.

No references cited.